July 17, 1956 G. K. PORTER 2,754,626
APPARATUS FOR SHAPING GLASS TUBES
Filed May 14, 1952 2 Sheets-Sheet 1
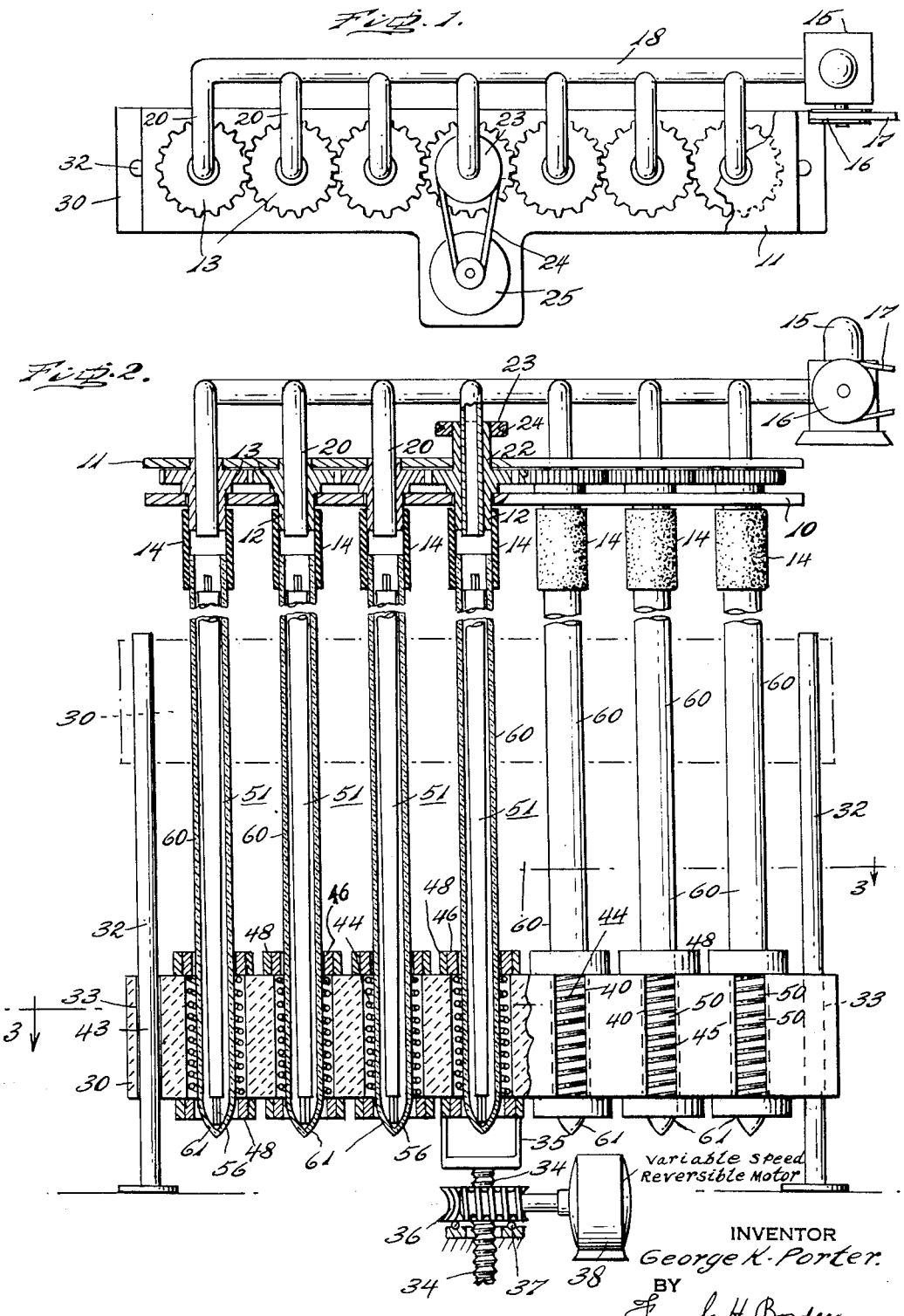
INVENTOR
George K. Porter.
BY
Frank H. Borden
ATTORNEY.

July 17, 1956   G. K. PORTER   2,754,626
APPARATUS FOR SHAPING GLASS TUBES
Filed May 14, 1952   2 Sheets-Sheet 2
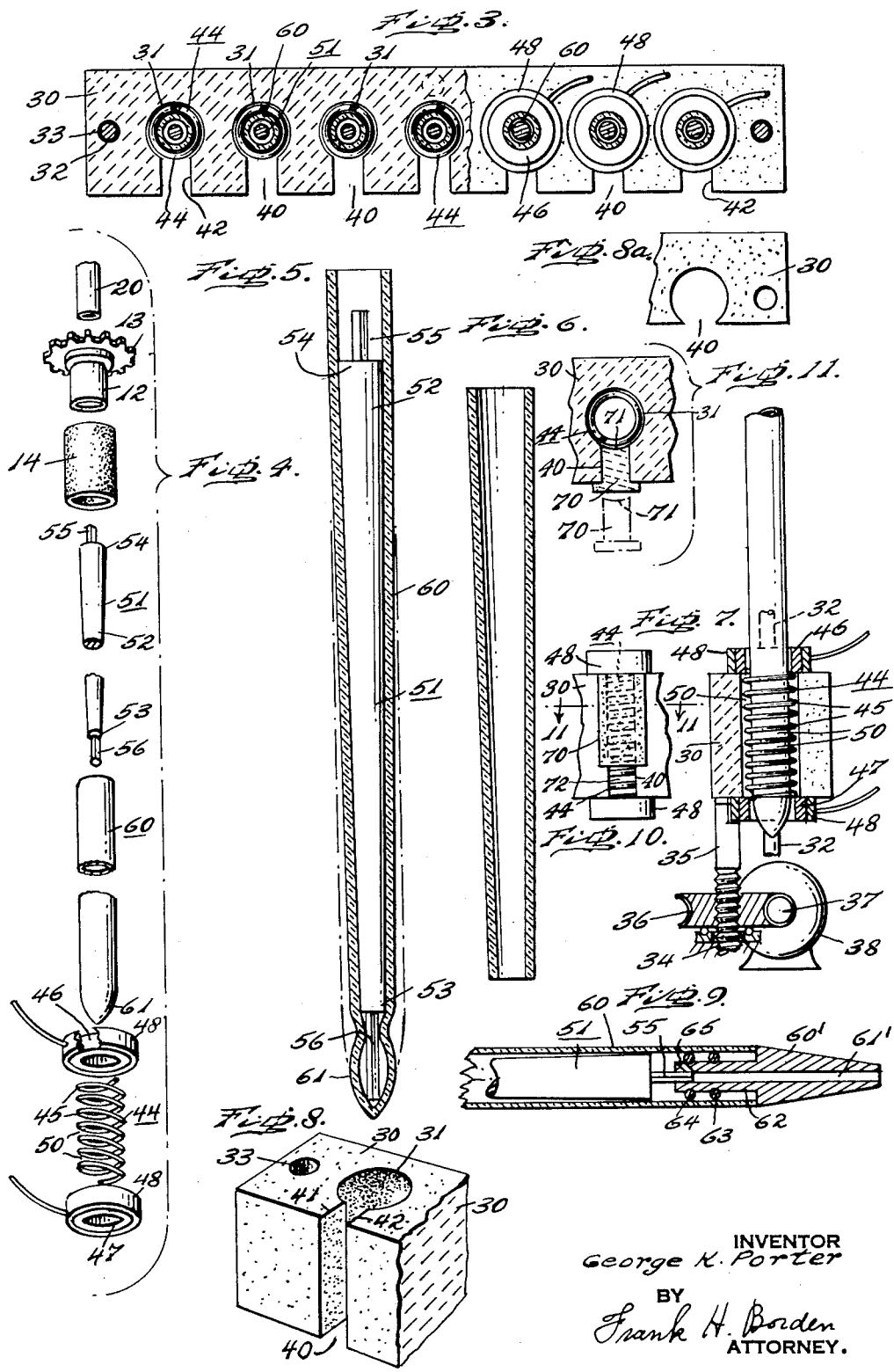
INVENTOR
George K. Porter
BY
Frank H. Borden
ATTORNEY.

United States Patent Office 2,754,626
Patented July 17, 1956

2,754,626

APPARATUS FOR SHAPING GLASS TUBES

George K. Porter, Hatboro, Pa.

Application May 14, 1952, Serial No. 287,784

5 Claims. (Cl. 49—7)

This invention relates to an apparatus for shaping glass tubes.

There are many uses in the arts for shaped glass tubes, and a typical but illustrative use is in flow meters of the type generally designated as rotameters. In this instrument, the tube is frusto-conical or tapered and is transparent so that the position of a float in the tube can be observed as it is positioned as a function of the rate of flow of a fluid passing upwardly through the tube and supporting the float. It will be understood that the glass tubes may be smooth-bored, as in the illustrative example disclosed herein, but that they may also be ribbed, or fluted as desired, for guiding the float in accordance with the various developments in the art. For general purposes, as noted, a smooth bored tube will be considered typical and illustrative, as the problems are substantially the same with all glass tubes.

The problem is to shape a piece of initially cylindrical tubing, such as the "boro-silicate" type of glass known as "Pyrex," into an exact accurate internally tapered frusto-conical tube in a reproducible series, without changing the characteristics of the glass and without setting up strains which must be relieved by additional annealing steps. So far as known, no prior art worker in the field has succeeded in achieving these results.

The basic steps in the formation or shaping of tubing of this character were discovered and patented by Kueppers, and with variations and detailed changes have been used by all other known practitioners. These basic and now ancient steps comprised the formation of a metal mandril having the desired external contour to impart the desired internal contours to the shaped tube, when conformed thereto, the closing of an end of the cylindrical tubing, the disposition of the mandril in the cylindrical tubing, the continuous exhaustion of air at the open end of the tubing passing about an end of the mandril, and the axially progressive heating of the tube to that temperature at which the viscosity of the plastic glass is of such a degree as to permit a form of flowing of the glass of the cylindrical tube to permit the external ambient pressures effective solely on the outer surface of the tubing to force the tubing against the mandril progressively along it length, to conform the tube to the contours of the mandril. As noted, this form of tube manipulation and shaping characterizes all known tube-forming practices. The coefficient of expansion of the metal mandril, usually of stainless steel, is higher than that of the glass, so that after cooling the mandril can be withdrawn.

In producing tubing according to this broad concept, it has been common to use what are characterized as glass lathes, in which the tubes are mounted horizontally or vertically and both ends are turned or rotated in synchronism, by two chucks driven together by an elaborate gear train or the like, while the tubing is bathed in gas flames. Usually the gas flames are made progressively incident on axially advancing areas so as to insure the collapse of the tube progressively on the mandril from the sealed end toward the open evacuating end.

While in some cases the mandril is preheated prior to insertion into the tubing, such preheat greatly complicates the handling problems, and the benefits thereof are not realized because of the rapid radiation from the heated mandril. Such initial or preliminary preheat of the mandril even when resorted to is to temperatures far lower than the temperature attained by the glass at its state of fusion in the gas flames. Accurate formation of the tubing requires the glass and mandril to attain approximately the same temperatures at the fusion state or the glass will be differentially heated and strained transversely of the wall of the tube. To achieve proper temperatures of the mandril according to present practices it is necessary to expose the glass to excessive overheating, in order to heat the mandril by conduction through the glass. Such conductive heating characterizes present practices. It will be seen that this procedure, while rapidly heating the glass, only slowly heats the mandril, as glass is a poor heat conductor, so that the transmission of heat axially along the mandril from the immediate zone of heating is delayed, so that any preheating of the glass in advance of the heated zone by heat in the mandril is minimized, as is slow cooling of the glass tempered by retained heat in the mandril behind the heating zone. It has been recognized that bathing the glass in gas flames, with their extreme temperatures, can so rapidly melt the glass beyond use, that it is necessary to rapidly progressively shift the point of application of greatest heat to the glass along the axial length of the tube, to minimize the highly adverse results of slow progression thereof. Consequently, in many cases, the mandril temperature is not raised to the proper point and due to incorrect expansion fails to secure the proper internal sizes of the tubes after shaping. While this accelerated progression of the flames comports with the desire of the manufacturer to speed his production, as in general, so far as known commercial practices are concerned, his apparatus can only shape one tube at a time, this has two definitely disadvantageous factors. Considering one standard size of tubing, the average time for the application of the melting heat from one end of the tubing to the other, is of the order of eight minutes. One inescapable adverse factor is the result of the overheating of the glass, in the physical and chemical changes therein, noted particularly as a change in its solubility. The other important factor lies in the continued relative coolness of the mandril and the speed of progression of the flames on the glass. This last, as noted above, minimizes the axial travel of heat in the mandril on either side of the zone of glass being heated, so that there is no time to elevate the temperature of the glass to a safe preliminary heat prior to entry of the glass into the gas flame heating zone in the forward travel, which short progressive areas of widely different glass temperatures sets up strains in the glass. More importantly, the abrupt change in glass temperatures relatively leaving the heating zone due to the relative coolness of the mandrel, increases the strains in the glass, so that so far as known, practically no tube made according to prior practices can be used as formed without a subsequent annealing procedure to relieve such strains. Obviously, this doubles the handling and increases the time and expense of producing a finished tube. Therefore, the cited illustrative eight minutes for the tube formation is inaccurate when the annealing step is contemplated.

Further, according to present practices, in order to accelerate the heating of the glass, it is customary to enclose or house the burners in ovens or the like, which enclose and conceal the tubing, especially at the zone or line of greatest heat. It is therefore impossible for the operator to actually observe what is taking place, so as to modify either the heat input or the rate of progression of the burner unit relative to the tube. As the results of underheat with old practices, is increase of glass scrap, the tendency is to keep the burners in operation at such pitch as to insure a maximum rather than a minimum heat input.

The primary disadvantage of known present methods and apparatus is the fact that excess heat must be applied to the glass to melt the glass to heat the mandril by conduction through the glass. This excessive heating changes the solubility characteristics of the glass, as compared with the solubility of the cylindrical tubing as initially furnished, so that the glass becomes of increased solubility to the fluids passing through the tube in service. While the adverse effects of increased solubility may depend for their acuteness somewhat upon the nature and temperature of the service fluids, they are always present in some degree, especially in the area of datum float location at which scouring flow against the inner surface of the tube is concentrated, so that the tubes rapidly become widely inaccurate, as well as of progressively less transparent, so that even without actual rupture of the tube from unrelieved strains therein, replacement is a frequent necessity. Moreover, the excessive overheating of the glass tube causes slight ripple-like irregularities to appear in the external surface of the shaped tube militating against exact readings of the float position. Owing to the leaching out of the internal surfaces of the tube, due to the increased solubility thereof, and also to the presence of partially unrelieved strains therein, frequent replacements of tubes in service is commonplace.

While the tapered tubes as produced by present known practices have attained wide commercial acceptance, it is, perforce, as nothing better has been available prior to the instant invention. These present commercial forms of tapered tubes are actually deficient in accuracy, they vary widely in important dimensional characteristics, have unfortunate surface characteristics, both visual externally and chemically and physically internally, which in use aid in developing unfortunate visual aspects internally, have short life, and in any case have required separate annealing steps, which may have effected further changes in dimensional characteristics, such as by warping, or the like, unless painstakingly accomplished. It is to be remembered that the tubes are designed for instrument use, where tolerances are extremely small, so that leaching out or scouring of the tube, especially in the area or zone of datum float position, by the service fluids, even to small degrees, upsets the calibrations and renders the instrument practically valueless.

It is among the objects of this invention: to improve the art of tube formation; to provide an apparatus for shaping tubes in which an entire series of useably identical tubes can be formed; to provide an apparatus for forming a plurality of tubes simultaneously; to improve tubes for instrument use; to provide an apparatus for shaping tubes on a mandril by heating the mandril inside of the tubing; to provide an apparatus for forming tubes in which the entire operation is visible to the operator so that the timing of the shape progression can be changed to accord with actual conditions instantaneously existing; to reduce the costs of tube shaping; to provide an apparatus for shaping tubes which obviates supplemental annealing steps; to reduce the time of shaping a single tube; to provide means for balancing the rate of heat output of respective coils of a plurality thereof in series; to provide an apparatus by which a plurality of tubes of relatively different wall thicknesses can be simultaneously shaped on respective mandrils at a timed rate of shape progression of all tubes; to provide a tube-forming apparatus with a sight window for effecting visual operation of the shape progression, with means for adjustably varying the area of the sight window while varying the heat input to a given tube; and to provide other objects and advantages as will hereinafter appear.

In carrying out the invention in an illustrative embodiment, a support is provided mounting at least one, and preferably, a plurality of vertically disposed pending tube engaging mounting connections in communication with an air evacuating system, such as a vacuum pump, on conduits which each mount a gear, with all of the gears in mesh with one driven gear, so that each tube mounting is rotated, either clockwise or counterclockwise. At least one, and preferably a battery of electrical heating units is mounted on a common support, initially spaced vertically from the tube-mounting connections. Each heating unit comprises a hollow vertical coil of heavy resistance wire, mounted and enclosed in suitable insulation except for an axially vertically extending sight window formed therein in front of part, at least, of the resistance coil and preferably for the full axial length thereof, and the turns of the resistance coil are held spaced apart so that observation of the interior of the coils can be made by the operator through the sight windows and through the spaces between the spaced turns of the coils. Each hollow coil is vertically aligned with a respective tube-mounting element. The coils are heated by the passage therethrough of alternating current of low voltage and high amperage, under the direct control of the operator. Means are provided for vertically progressing the battery of heating coils toward the hose couplings either manually, or by a variable timing control.

Suitable lengths of the initially cylindrical tubing are "bottomed-off" so as to be air-tight at the bottom ends, and stainless steel or like properly shaped tapered mandrils are dropped into the respective tube lengths, with the small ends downward. Usually each end of the mandril mounts a reduced axial extension, so that the smaller end of the tapered mandrel is held above the bottomed-off end by its extension. The tubing lengths with inserted mandrils are then inserted axially upwardly into the respective tube-mounting connections, the rotation of the connections rotating the tubes and enclosed mandrils, which are then respectively threaded through the respective hollow coils and the evacuation pump is started. The heating coils are of such internal diameter as to have a more or less slight clearance from the exterior surface of the enclosed tubing. This is, say, of the order of ⅛″ on the diameter of the tubing. Starting just below the lower end of the mandrils, generally slightly above the lower sealed ends of the tubes, the tubes and enclosed mandrils are held in the respective heating units, but in constant rotation therein while the preheating is started. The preheat is by radiation from the coils directly through the glass into the mandril, which is rapidly brought up to proper temperature and degree of expansion, which mandril re-radiates and reacts upon the glass to heat and soften same. This is perfectly observable through the sight windows between the turns of the heating coils, and when the softening has attained the proper degree to permit the relative high pressure externally on the tube to collapse the tube on the mandril, this is visually evident in a sort of magnification effect where the flowing has started. The timing or progression of the battery of heating units, axially along the respective tubes and the enclosed mandrils is started, and is changed in speed as desired according to the visual indications noted by the operator in the heating zones of the heaters. As the heating battery rises relatively on the tubes, there is continued heating of the mandril to accord with the proper glass temperature, and this is facilitated by the almost inevitable presence on the surface of the mandril of an oxide, which, being dark, absorbs the heat radiated from the coils at the proper rate. When the heating battery has relatively risen far enough to bring the glass into contact with the thicker end of the mandril, the shaping is completed, and the battery of heat units is relatively downwardly withdrawn, clear of the now shaped tubing, the mandrils are withdrawn, the ends of the shaped tubes are cracked off, and the tubes are then, or later, cut and ground at the ends to the required lengths.

In the accompanying drawings forming part of this description:

Fig. 1 represents a top plan of an illustrative simplified version of the invention in partial fragment.

Fig. 2 represents a fragmentary front elevation of the apparatus mounting and operating on a plurality of tubes, shown partially in section.

Fig. 3 represents a horizontal section taken on line 3—3 of Fig. 2.

Fig. 4 represents an exploded fragmentary perspective of the organization of one tube, mandril and the complemental parts, including the heating coil.

Fig. 5 represents in dotted lines the initial cylindrical tube and in full lines a section of the ultimate shaped tube as effected by the invention herein, with the mandril shown in elevation.

Fig. 6 represents a longitudinal section through an illustrative shaped tube.

Fig. 7 represents a fragmentary vertical transverse section through the heating unit and an illustrative tube.

Fig. 8 represents a fragmentary perspective of the insulating block for mounting the resistance coil of the heating unit.

Fig. 8A represents a fragmentary plan of an insulating block with a modified disposition of the sight window.

Fig. 9 represents a section through an alternate form of a portion of the apparatus.

Fig. 10 represents a fragmentary front elevation of one of the heating units, with a block, preferably one of a series of different length blocks, mounted in the sight window to terminate above the critical area of inspection therethrough, for increasing the reflection and radiation of heat upon a tube.

Fig. 11 represents a fragmentary transverse section through the fragment of Fig. 10, showing the relation of the parts.

The invention illustratively comprises a relatively stationary portion, usually at the top, in a vertical form of the device, and at one end in a horizontal form of the device, while a relatively movable portion is provided toward the bottom of the device, in the vertical form, and toward the other end thereof in the horizontal form. While it will be clear that either portion or both portions may be movable relative to the other, in the interests of simplicity the assumption will be that the upper portion is stationary. This portion comprises a suitably supported organization comprising a lower, narrow but elongated, support plate 10, and a parallel spaced narrow, but elongated, upper plate 11. The dimensions of the plates are those compatible with the plurality of tube-supporting and rotating units mounted on the plates. Journalled for rotation in and between the plates is preferably a plurality of vertical short tubes 12, mounting gears 13. The respective gears are in a series aligned along the plates with contiguous gears in mesh. Rotation of one gear rotates all of the others and thus the tubes 12. The tubes 12 extend sufficiently far below the plate 19 as to mount the tube engaging short hose connections 14. Any other desired coupling or connecting device for sealingly engaging and frictionally supporting a glass tube may be mounted for rotation by the respective gears 13.

A suction pump 15 is provided, driven by suitable means such as by a pulley 16 driven by a powered belt 17. The intake side of the pump 15 is connected to a manifold or the like 18, having tap-off connections 20, the terminal ends of which are sealingly engaged within the short rotatable tubes 12, so that when the pump is working the intake is from within the hose connections 14. One of the short tubes 12, and for symmetry and distribution of load the central one of a plurality is preferred, has an axial upward extension 22, mounting a driving means, such as a pulley 23, driven by a belt 24 in driven relation to a power source, such as a motor 25. Any other desired organization of drive can be used, as may be found most expedient. Whatever it may comprise, when actuated, the respective hose connections 14 are constantly driven in rotation, respectively clockwise and counterclockwise, according to the order of the gearing, as will be clear.

The heating unit, designated as the relatively movable unit of the apparatus, comprises a block of insulation, such as a ceramic 30, having vertical bores 31, the axes of each respectively aligned vertically with the axis of the respective hose connections 14. The insulating block 30 is suitably guided for vertical movement as by the illustrative fixed vertical side guides 32, passing through guide apertures 33, in the insulating block. The block 30 will be suitably reinforced and braced as to maintain its rigidity and strength in use. Any desired means is provided for vertically moving the block 30 at a variably timed rate. Illustratively this may comprise a threaded shaft 34, rigid with the block 30, as by brace members 35, and mounting a rotatable nut 36 as a worm wheel in mesh with a worm gear 37 driven by a variable speed reversible motor 38.

The insulating block 30 is either so formed, or is cut away to form, vertical sight windows 40, extending preferably the full length of the bores 31, and may be defined by spaced walls of the insulation as at 41 and 42, or may be formed by having the forward wall of the insulation block cut off at a plane parallel to a tangent to the bore as indicated in Fig. 8A.

Resistance coils 44 are provided, of plural turns 45 of heavy resistance wire, connected to upper and lower conducting sleeves, respectively 46 and 47. Illustratively, this is No. 11 wire, the diameter of which is of the order of .073". The sleeves and coil are mounted as units in the respective bores 31 of the insulating block and the sleeves are anchored in suitable bus bar segments 48, to which by suitable connectors, power is supplied. Preferably this is A. C. and as noted this is of relatively low voltage of the order of 25 volts, but of high amperage. This power input is suitably and conventionally controlled and varied with conditions as the operator may find them. The sleeves 46 and 47 in their anchorage in the bus bar segments 48 place separating tension on the turns of the particular coil, so that an observation space exists between adjacent turns, as indicated at 50. An adequate space is provided with a total spacing in the length of the coil equal to the diameter of the wire used in a coil length of the order of 1½". Obviously this is illustrative and not critical and any thickness of wire and any spacing may be used which will insure adequate radiant heat with visibility.

It will be understood that the mandril 51 may be fluted or ribbed to impart desired internal shape to the ultimate tube, but as noted a plain tapered mandril will suffice for illustrative purposes and will be so used. It may be noted that the ordinary tapered mandril for rotameter purposes at least has a very small degree of taper, so that in the illustrative form disclosed, for clarity, the taper has been exaggerated.

The preferred form of mandril 51, for purposes of this invention, comprises a preferably solid tapered shank 52, having a smaller end 53 and a larger end 54. An axial extension 55, usually a polyangular section, extends upwardly beyond the larger end 54, and a similar axial extension of similar construction extends beyond the smaller end as indicated at 56. The tubing to be shaped is preferably a cylindrical tubing 60, preferably of the heat-resistant type known as "Pyrex" as furnished by Corning Glass Co. The tubing is cut to the proper lengths and one end of each length is "bottomed-off" by heat sealing as indicated at 61.

The mandrils are dropped into the respective glass tube lengths with the smaller tapered end suitably spaced above the bottomed-off end 61, by the lower extension 56, resting on the inner surface of the end 61. The tubing lengths containing the mandrils are then inserted axially upwardly into the respective hose connections so that the tubes are frictionally supported while communication is established from the interior of the upper end of the tubing to the evacuating pump 15. The battery of heating units is then moved upwardly and the ends 61 of the tubes are threaded through the bushings and coils of the heating unit. The motor 25 or other power source is started and the rotations of the hose connections and thus of the mandril and tubing section begin. Power is supplied to the heating units. The power is controlled so that starting adjacent to or just below the smaller end of the mandril, this portion and the lower end of the mandril are in the greatest heat zone. The operator looks through the sight window and between the turns to see when the heating is at just the proper effectiveness. The heat radiating from the coils passes through the glass by radiation and into the mandril which heats at least as fast, and usually faster than, the glass. By re-radiation from the heated mandril, which, being of stainless steel, can stand greater heat than the glass itself without damage, the glass comes up to just that temperature at which slow flow can occur and at which it can respond to differential pressures on opposite sides of the tube. As it moves even slightly in response to these differential pressures, this fact can be observed by the operator, as a sort of magnification effect at this point takes place. There is a visual change between the fluid and slowly flowing or collapsed glass and the portion of the tube which has not yet begun to flow, which establishes what may be termed a line of fusion or coalescence. In some respects the softened and mandril-clinging portion seems to be magnified in contrast to the as yet non-clinging portion of the tube. At any rate, the upper limit of demarcation between the flowing and enclosing glass can readily be descried visually. The operator is thus able to determine exactly when the preheat and start of the shaping of the tube takes place. This avoids the hazard of excessively elevating the temperature of the glass to the point of physical and chemical change therein, as is such a deterrent factor in present gas-heating practices. Not knowing what is happening under the concealment of the gas burner organization, the present practice is simply to force the heat in and maintain it long after fusion has occurred. As soon as the flow of the glass starts, forcing the viscous glass tube against the smaller end of the mandril according to this invention, the motor 38 is started, or other means for gradual elevation of the heating battery is brought into action, and the battery of heaters is elevated relative to the tubes and mandrils. By observation of the line of fusion in the axial length of the heating coils, at which the flow of the glass against the mandril takes place, which usually should not be higher generally than the center of the coil, the speed of progression of the heating coils along the tubing is regulated. It is to be observed that by radiant heat from the length of the coil, readily passing through the glass of the tube but probably having its greatest concentration about in the center of the coil, the mandril is directly heated in advance of the heating of the glass. Not only is the zone of the mandril within the coil heated, but, owing to the good conduction of the metal of the mandril, this heat is conducted axially along the mandril. This not only re-radiates within the coil to heat the glass, augmenting the heating effect of the radiant heat on the glass directly from the coils, it both preheats the glass in advance of the heating zone established by the coil so as to minimize the formation of strains on the glass as it relatively enters the heating zone in the coil, it also continues to heat the glass on the far side of the heating zone to prevent it from cooling at more than a slow rate as the heating zone is withdrawn axially of the tube, which effectively anneals the formed glass. The end product is free from disruptive strains, without any additional annealing steps, and this factor is enhanced by the relatively slow progress of the glass and heating coil, as compared with the gas-flame-heated tubes of the prior art. With tubes of the same illustrative size as that which in the prior art requires about eight minutes, the present apparatus may take as high as twenty-one minutes. This slow heating and slow cooling not only makes a more perfect tube, but as emphasized, obviates separate annealing steps. The disadvantage in time of production even with one tube formed by the apparatus, is more than compensated for by the enhanced perfection of the finished tube, as instrumentwise there is no comparison between the respective tubes. However, as noted, it is preferred to shape a plurality of tubes simultaneously, and this is possible in a small organization according to the invention herein. For illustrative purposes, applicant has shown an apparatus capable of simultaneous shaping of seven tubes. There is no known obstacle to a great increase in this number, within the range of power available. With seven tubes shaped simultaneously, it will be seen that in contrast to the eight minute timing of one tube by old methods, the time for making of tubes by the instant apparatus averages out to, say, three minutes per tube. So that both in end product and in time and productions costs, the present invention effects great savings.

Mention has been made of the location of the line of fusion in the coil. While generally it is found best that it be generally centrally located in the coil, this is not essential, and it may vary axially in the tube from the center in either direction, although preferably it varies downwardly from the center if at all, to avoid the possibility of overheating the already formed glass. A lot depends upon the diameter and thickness of the glass wall and the power input to the coil.

At any rate, by the invention herein the location of this fusion point is observable and the factors affecting its development, both in power applied to the coils and the rate of progression of the heating battery relative to the tubes, are within the close and expeditious control of the operator. In this connection, any conventional voltage and amperage controls may be used as are desired, and these are omitted herein for simplicity of the disclosure. Similarly, limit switches for controlling the vertical travel of the heating battery, which are conventional, are also omitted, although for safety, such switches will be provided.

When the heating battery has advanced relative to the tubes and mandrils far enough to establish the conical tube formation past the ultimate ends of the finished tapered tubes, the motor 38 is reversed and run rapidly to lower the heating battery below the finished tubes. When the tubes have cooled sufficiently in the air, they are axially removed from the respective friction couplings comprised of the illustrative hose connections, the mandrils are dropped out, and the ends of the tube are removed at such points or lines as will comport with the desired ultimate internal diameters of the finished tubes, determined, for instance, by dropping into the tubes balls of known diameters and marking the resting places thereof for severance of the tube portions.

The finished tubes are free from strains, have had no appreciable changes in solubility, and in service have long life with continued accuracy. While it may depend somewhat upon the exactness of uniformity of the mandrils as to dimensions thereof, whether all finished tubes of a series of simultaneously formed tubes are identical in dimensions, and by the methods hereof such substantial identity is attained as to be within useable limits of tolerance for all tubes of the same series, it is important to note that the tubes formed on any given mandril are so close to identical that an endless series of tubes within a minute tolerance factor of deviations is obtainable. This is perhaps the first time in the history of the industry that this has been possible.

Mention has been made of the glass lathe type of support for the conventional gas flame heated tubes. According to all known prior art methods of forming tubes it has been customary and even considered as essential, that both ends of the glass tube be supported and rotated in synchronism. This has required not only support for both ends of the tube, but also a more or less elaborate gear train for rotating both supported ends of the tube. It is a feature of this invention that by the pendent support disclosed in a vertical type of the apparatus, the rotation needs only be given to one end, as the tube and mandril turn together throughout the process, while the outer free end is simply guided in support by the inner surfaces of the sleeves 46 and 47 or the like, out of actual contact with coils 44. It is a further feature of this invention to provide rotation by the timed gearing for only one end of the tube in a horizontal type of apparatus. For one form of the invention illustrative of this point, reference may be made to Fig. 9.

In Fig. 9 the lathe chuck of the glass lathe (not shown) receives a tapered hollow bushing 60', having a bore 61' for the egress of air from the tubing. The bushing 60' has an axial reduced cylindrical extension 62, mounting two O rings 63 and 64. The bore 61' at the inner end in extension 62 is angularly shaped to receive the polyangular mandril extension 55, in such relation as to cause rotations of the bushing 60' to positively drive and rotate the mandril 51. A lateral bore 65 extends from main bore 61' to the surface of reduced cylindrical extension 62, beyond the innermost O ring 64, so formed as to maintain communication past the inserted extension 55 of the mandril. The heating battery is mounted with the glass-receiving bores in horizontal alignment with the bushing 60', and the latter is in sealed communication with the evacuating system. If desired, additional fixed supports (not shown) can be mounted on the lathe for supporting the free ends of the tubes. These are passive supports and have no necessary part in the positive rotation of the tubes. The tube 60 is slid over the mandril, after the latter has had its extension 55 moved into the complemental portion of bore 61', with the advancing end of the tube slid sealingly over the O rings. If desired, this form of coupling can be used, in whole or in part, in place of the short hose connection 14.

The same heating and observation factors then occur as with the vertical type, with the same advantageous formation of the ultimate tapered tube, but it is important to note that in this case, while the tube is positively driven by the friction of the O rings, the mandril is positively driven from one end at the bushing. As the mandril is rigid, rotation of one end, of course, drives both ends, without the past expensive and cumbersome procedure for driving both ends of the mandril and tube.

In general the preceding description has pertained to the simultaneous formation of a plurality of tubes of generally related dimensional characteristics. It will be evident that requirements may involve the simultaneous formation of a plurality of tubes which may be of appreciably different characteristics, as in wall dimensions, for instance. It will be evident that the heat necessary to obtain flowable viscosity of one relatively thin tube in a given time interval would be much less than that necessary to attain the same state in a tube of a relatively thick tube. While this can be effected by individual circuit controls for the heating units for the respective tubes, this both increases the number of controls necessary, and requires time and skill for the respective settings thereof.

It will be apparent that the amount of heat reflected from the coil of a heating unit is diminished by the presence of the sight windows, permitting some loss of radiant heat from the coils. This may create relative zones of heat and less heat peripherally of the coils, but this is equalized in effectiveness by the rotation of the tube being shaped. When all tubes have the same general thicknesses, this is not a deterrent, and all of the heating units can be placed in series with the power and controlled by a single agency, or a limited number of agencies, with smaller series couplings. However, with tubes of disparate thicknesses, with such series arrangement and control, it will be evident that simultaneous progression of all tubes will not effect equal and proper shaping thereof.

It is part of this invention to balance the heat demand to the heat supply without adding individual control agencies for the respective heating units. To this end, as indicated in Figs. 10 and 11, a series of blocks of ceramic or like material is provided, of varying lengths, individually insertable into and removable from the respective sight windows. The length of a given block will be determined by reference to the heat demand of a given tube, as determined by its relative wall thickness, as compared with that of other tubes in the series. The block, illustrated as a block 70, is, illustratively, about ¾ of the full length of sight window 40, is mounted at the upper end of the window, as shown in Fig. 10. It has an inner surface 71 conforming to the contour of the recess 31, and leaves the important lower, illustratively, ¼ of the sight window, indicated at 72, for observation of the coil 44 and the passing shaped tube.

The block 70 increases the heat effective on the mandril and tube within the heating unit by diminishing radiation out of the unit, and by increased reflection inwardly of the unit, and with reasonable care in its assembled or mounted length secures the proper degree of viscosity to shape the thicker walled tube in the same time as an adjacent coil with no block, or a smaller block, attains the same status for a thinner walled tube.

Obviously, the mounting of the block 70 in the window 40 will be by any desired means, whether by an external pivot on which it can swing in and out of the window, by vertical control means, or by frictional mounting in the window, or the like.

It is repeated that although for illustration the mandril and tube are disclosed as forming a tapered tube, this is an illustrative term, as any shaped tube can be formed by the invention herein, including those identified as ribbed, grooved, or beaded, and including those in which the varying volumetric capacity of the tube is formed by indented ribs or grooves of varying width in cylindrical tubes.

It may be pointed out that the dimensions used and the proportions of sizes and lengths of parts may vary within wide limits as the only essential is that a desired length of the shaped tubing be formed on the mandril, regardless of how much more tubing is used with the apparatus for ultimate discarding.

Finally, it should be pointed out that the invention is not limited to the shaping of glass, as other thermoplastic materials, such as methylmethacrylate, for instance, can be similarly shaped by the same apparatus.

Having thus described my invention, I claim:

1. An apparatus for shaping tubes comprising a plurality of individual glass tube-engaging devices, means for supporting said devices, means for rotating all of said devices, an evacuating system, conduit means establishing communication between said system and the respective devices, an insulating support having spaced parallel bores, the respective axes of which are substantially coaxial with the axes of the respective devices, hollow electric radiant heating coils in said bores, and means for relatively moving the insulating support and the means for supporting the devices axially of said bores whereby to progressively heat tubes mounted on said devices and passing through the hollow coils.

2. An apparatus for shaping tubes comprising a plurality of individual glass tube-engaging devices, means for supporting said devices, means for rotating all of said devices, an evacuating system, conduit means establishing communication between said system and the respective devices, an insulating support having spaced parallel bores, the respective axes of which are substantially coaxial with the axes of the respective devices, hollow electric radiant heating coils in said bores, means for relatively moving the insulating support and the means for supporting the devices axially of said bores whereby to progressively heat tubes mounted on said devices and passing through the hollow coils, said insulating support incorporating sight windows extending into the respective bores, and said coils having spacing between the turns of the coils in line with said windows to permit visual observation of the glass in the radiant heating coils.

3. An apparatus for shaping a plurality of tubes simultaneously which comprises a plurality of connections for glass tubes, the axes of which lie substantially in a plane, means mounting the connections for rotation, gearing between the respective connections for rotating the connections in synchronism, means for rotating said gears at a determined rate, an evacuating system having communication with the respective connections so that glass tubes containing mandrils mounted on the connections are evacuated by the system, a plurality of individual hollow radiant electric heating coils, means mounting the coils so that their axes lie substantially in said plane and in substantial alignment with the respective axes of said connections, and means for moving the mounting means for the coils at a predetermined rate toward said connections.

4. An apparatus for shaping a plurality of tubes simultaneously which comprises a plurality of connections for glass tubes, the axes of which lie substantially in a plane, means mounting the connections for rotation, gearing between the respective connections for rotating the connections in synchronism, means for rotating said gears at a determined rate, an evacuating system having communication with the respective connections so that glass tubes containing mandrils mounted on the connections are evacuated by the system, a plurality of individual hollow radiant electric heating coils, means mounting the coils so that their axes lie substantially in said plane and in substantial alignment with the respective axes of said connections, means for moving the mounting means for the coils at a predetermined rate toward said connections, the turns of each heating coil being spaced from adjacent turns for at least an appreciable axial extent of the coils, and sight windows formed in said mounting means for visual observation of the glass tube disposed in the said appreciable extent of the respective coil.

5. An apparatus for shaping tubes comprising a plurality of substantially parallel heating coils each having spaced turns, heat insulating means having cylindrical bores mounting the heating coils and having axially extending substantially radial slots respectively forming a sight window for each coil, and supplemental means comprising a plug of heat insulating material mounted in a slot for reducing the area of a sight window of one coil, while increasing the reflection internally of said coil.

References Cited in the file of this patent

UNITED STATES PATENTS

| | | |
|---|---|---|
| 241,976 | Haines | May 24, 1881 |
| 1,268,374 | Marcus | June 4, 1918 |
| 1,301,714 | Kueppers | Apr. 22, 1919 |
| 1,583,464 | Houskeeper | May 4, 1926 |
| 1,593,725 | Sharpe | July 27, 1926 |
| 1,606,128 | Parker | Nov. 9, 1926 |
| 1,708,961 | Abbott | Apr. 16, 1929 |
| 1,999,525 | Morcholz | Apr. 30, 1935 |
| 2,259,256 | Maas et al. | Oct. 14, 1941 |
| 2,286,401 | Everett | June 16, 1942 |
| 2,470,234 | Brewer | May 17, 1949 |
| 2,490,252 | Brewer | Dec. 6, 1949 |
| 2,552,108 | Molinari | May 8, 1951 |
| 2,633,522 | Berg et al. | Mar. 31, 1953 |

FOREIGN PATENTS

| | | |
|---|---|---|
| 497,486 | Great Britain | Dec. 19, 1938 |